United States Patent [19]
Lieb et al.

[11] 3,865,245
[45] Feb. 11, 1975

[54] BICYCLE RACK

[75] Inventors: Philip C. Lieb; David A. Kesselman, both of Mill Valley, Calif.

[73] Assignee: Rally Enterprises, Inc., Mill Valley, Calif.

[22] Filed: Aug. 28, 1972

[21] Appl. No.: 284,107

Related U.S. Application Data

[63] Continuation-in-part of Ser. No. 230,848, March 1, 1972, abandoned.

[52] U.S. Cl. .................................... 211/5, 70/234
[51] Int. Cl. ..................... B62h 3/00, E05b 73/00
[58] Field of Search ............. 211/5, 4, 8, 7, 17, 22, 211/19, 18, 20; 70/234, 235, 233, 236

[56] References Cited
UNITED STATES PATENTS

| | | | |
|---|---|---|---|
| 613,773 | 11/1898 | Neumann | 211/17 X |
| 636,629 | 11/1899 | Butcher | 211/5 |
| 1,428,649 | 9/1922 | Miller | 70/236 X |
| 2,508,302 | 5/1950 | Stue | 70/233 X |
| 3,647,072 | 3/1972 | Strang | 211/4 |
| 3,739,609 | 6/1973 | Kaufmann | 211/5 X |
| 3,749,295 | 7/1973 | Palmer | 211/5 X |

FOREIGN PATENTS OR APPLICATIONS

| | | | |
|---|---|---|---|
| 790,304 | 9/1935 | France | 211/17 |
| 258,495 | 5/1949 | Switzerland | 211/5 |

*Primary Examiner*—Ramon S. Britts
*Attorney, Agent, or Firm*—A. W. Breiner

[57] ABSTRACT

A rack is described for receiving and locking bicycles in place and in an upright position comprising guide means constructed and arranged to receive a front wheel of a bicycle and having lock means secured thereto for engaging the bicycle frame at or to the rear of the sprocket. The guide means has a vertical extension at the front end which preferably extends above the hub of the front wheel to protect the wheel mechanism. The bicycle is rolled into the vertical extension of the guide means and the back wheel of the bicycle is moved into engagement with the lock means and the lock means secured. The rack when secured holds the bicycle to the ground, prohibiting any movement which would permit removal of the bicycle, wheel gears, or wheels thereof.

10 Claims, 7 Drawing Figures

BICYCLE RACK

This application is a continuation-in-part of U.S. Ser. No. 230,848 filed Mar. 1, 1972 now abandoned.

FIELD OF INVENTION AND BACKGROUND

The present invention is directed to a rack for bicycles. More particularly, the invention is directed to a rack for receiving and locking bicycles in place and in an upright position while preventing any movement which would permit removal of the bicycle, wheel gears, or wheels thereof.

In the prior art, many racks are available for holding bicycles in an upright position. Moreover, racks or other means are available for locking bicycles to stanchions and to buildings, or the like, preventing movement thereof by other than the rightful user. All of such designs, however, which are capable of locking are not constructed to prevent removal of parts, or stripping of the bicycle, which can be a substantial loss particularly on multiple-speed bicycles. Moreover, the prior art designs cannot be conveniently utilized in racks which are positioned at central locations for parking bicycles temporarily, and/or which are coin-operated.

OBJECTS AND GENERAL DESCRIPTION OF INVENTION

Accordingly, it is a primary object of this invention to provide a bicycle rack for receiving and locking in place bicycles and preventing any movement which would permit removal of the bicycle and/or wheel gears and/or wheels.

It is another object of this invention to provide a bicycle rack for receiving and locking in place bicycles which is adapted to receive bicycles of varying lengths and heights and which will prevent any movement which would permit removal of the bicycle, its wheel gears, or wheels.

It is another object of this invention to provide a bicycle rack for receiving and locking in place bicycles and prevent movement which would permit removal of the bicycle and/or wheel gears and/or wheels, which is coin-operated.

It is another object of this invention to provide a bicycle rack for receiving and locking in place bicycles and prevent movement which would permit removal of the bicycle and/or wheel gears and/or wheels which is to be locked with a padlock.

These and other objects of this invention will be apparent from the following detailed description particularly with reference to the drawing.

The objects of the present invention are accomplished through the construction of a bicycle rack having guide means in operable association with lock means secured to the guide means. The guide means is constructed to receive the front wheel of a bicycle and has lock means secured thereto for engagement with the bicycle frame or sprocket substantially at or to the rear of the sprocket. The guide means has a vertical extension at the front thereof which preferably extends above the hub of the front wheel to protect the wheel mechanism.

In one embodiment the guide means forms a channel sufficiently long to receive the front wheel of the bicycle as well as to partially receive the rear wheel of the bicycle. Lock means are positioned on the guide means at substantially the center of the sprocket mechanism and comprises an adjustable lock bar which is capable of being swung over or away from the bicycle frame near the sprocket mechanism and pressed downwardly over the bottom bracket of the bicycle frame to the lock position, precluding movement of the bicycle. Preferably, the lock bar is movably operated by a coin and key mechanism. In operation, the bicycle operator will lift or roll the bicycle into the channel guide in order that the front wheel is positioned between the vertical extension at the front end of the guide channel and the rear wheel is positioned so that the wheel is within the channel. The lock bar is swung over the bottom bracket of the frame of the bicycle and thereafter pressed into the lock position. The lock mechanism of the lock means is substantially conventional, with it only being essential that the lock bar is capable of adjustment to meet the requirements of bicycles of varying heights. Moreover, it is essential that the lock bar of the lock means be capable of swinging free when the key is in place. However, once the key is turned into the lock position and removed, the lock bar is to be stationary. Lock devices of this general type are known in the art and will not be described in detail herein.

In another embodiment the lock mechanism is positioned rearward of the sprocket to engage the U-frame member rotatably securing the rear wheel. According to this design the guide means will have only a single vertical guide member, i.e., in the shape of an L rather than a U. In addition to the lock bar, a second and cooperating bar is secured to the lock box means. This second bar is designed to pass under the U-frame member holding the rear wheel and through the spokes of the rear wheel. The lock bar is swung over the top of the inward leg of the U-frame member and is locked into position through a hole or slot in the second bar. In operation the bicycle operator will lift or roll the bicycle into the front extension of the guide means as before, and the rear wheel then pulled into cooperating position with the second bar and thereafter the lock bar secured.

A modification of the latter embodiment utilizes a top bar which can be movably secured or fixedly secured to the top of the second bar member in place of the lock bar and lock mechanism. In this design the first bar is positioned on the bottom of the U-frame member holding the rear wheel, and the second bar passes over the top of the U-frame member. A padlock is secured through the two members to lock the bicycle into position.

As is apparent, various modifications can be made to the rack designs utilizing the general concept set forth herein. In all of these designs, when the bicycle is locked in the rack, it is incapable of being removed; and, furthermore, it is impossible to move the bicycle sufficiently to remove the wheels, wheel gear boxes, or the like. The rack is capable for use individually by a bicycle operator at his home or at a place of work, or it is adaptable for use in a multiple-bicycle parking installation where bicycles are left temporarily. In the latter event, the lock box can be operated by a coin-operated lock box if used on a random basis; or if by a regular user, either by a coin-box or an individual padlock. The rack is conveniently secured by bolting of the guide means into concrete, asphalt, wood, or the like footing.

THE DRAWING AND DETAILED DESCRIPTION OF THE INVENTION

The actual construction of the bicycle rack will be more readily apparent from the accompanying drawing wherein like numerals are employed to designate like parts and wherein FIG. 1 is a view from the rear and to the side of one embodiment of the lock rack having a bicycle positioned in the rack;

Figure 1:
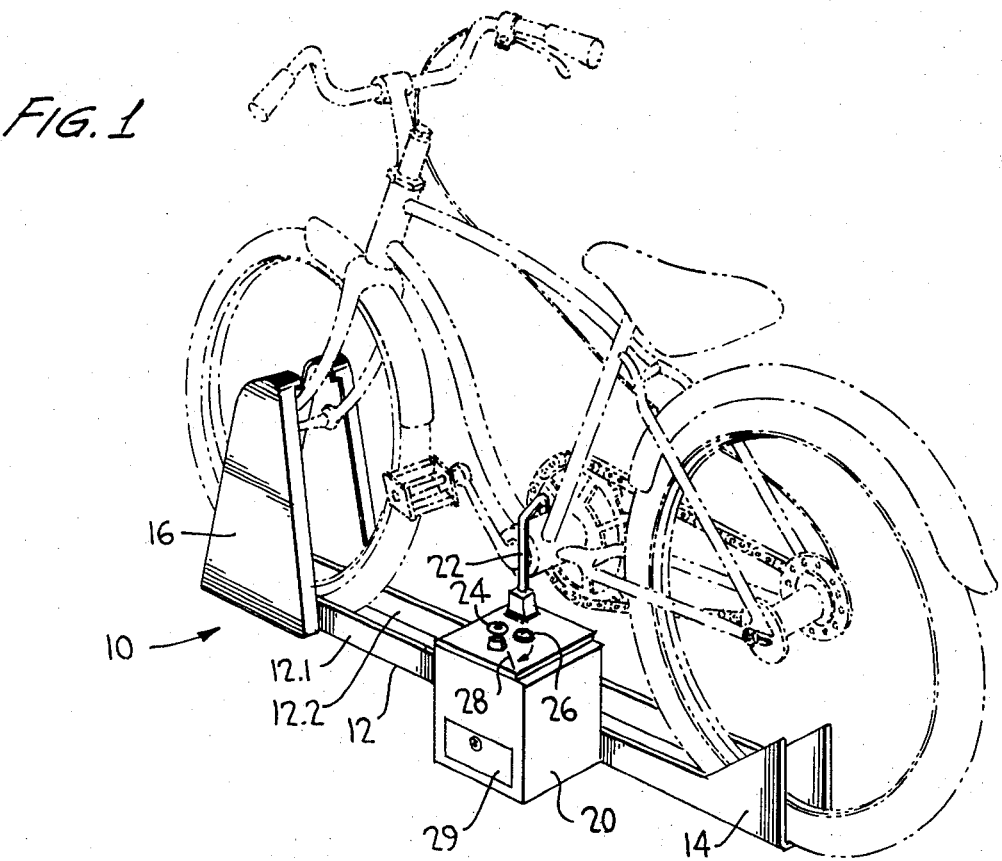
Figure 3:
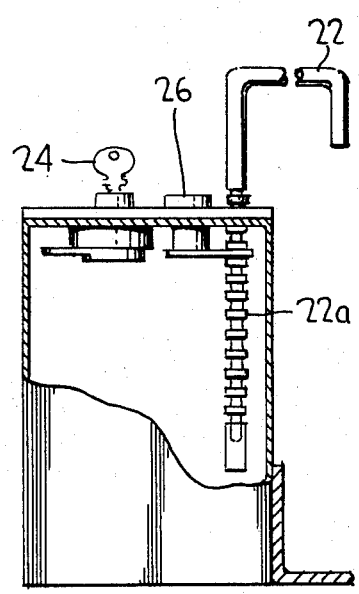
FIG. 3 is a partially broken-away view showing the internal details of an adjustable lock bar.
Figure 2:
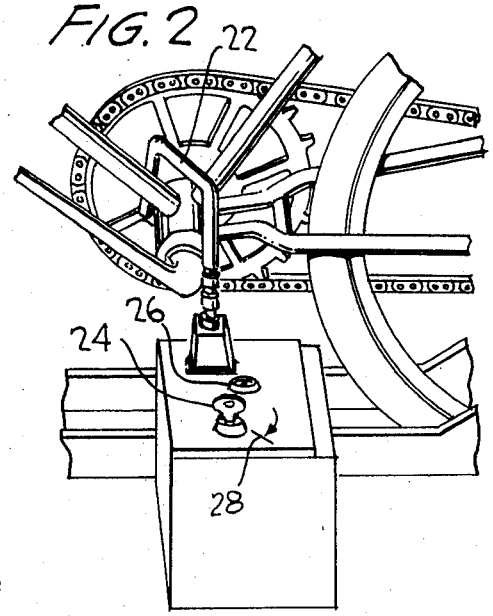
FIG. 2 is an enlarged view of a part of FIG. 1 showing in greater detail the lock means with lock bar secured through the sprocket and bottom bracket of the frame of a bicycle.

More specifically, the embodiment of the rack shown in FIGS. 1 – 3 is described generally by reference numeral 10 and comprises guide means 12 having vertical members 12.1 and 12.2 and a flared end portion 14 for receiving the rear wheel of the bicycle. The forward part of the guide rail has vertical extension 16 which extends to protect the hub of the bicycle. Lock means 20 is secured to the guide channel by welding or other suitable means slightly to the rear of the center of the guide channel. In this location lock bar 22 is capable of being swung over the bottom bracket of the frame of the bicycle. As seen most clearly from FIG. 3, the short, downward leg of lock bar 22 is preferably offset from vertical to permit more convenient movement of the bar over and away from the bicycle frame and sprocket. In view of the adjustable nature of the lock bar as a result of the milled slots 22a, the rack is capable of accommodating bicycles of varying heights. The lock means comprises, in addition to lock bar 22, a key 24 for locking the lock bar into position and unlocking the lock bar. The lock bar has a flat milled surface to permit "free" movement of the lock bar when not locked. In the preferred embodiment and in the embodiment shown in the drawing, the lock means includes a coin slot 26 and a coin box 29 for a coin-operated mechanism. Additionally, the lock box as seen most clearly from FIG. 2 contains a guide mark 28 which shows the proper lock movement of the key. Since the lock mechanism is conventional and does not form a part of this invention, it will not be described in detail. Reference is made to U.S. Pat. Nos. 663,488; 1,076,587; 1,077,846; 1,105,980; 1,120,294; 1,239,244, and 1,321,298 which describe coin-operated lock mechanisms. Additionally, a suitable device is available from Ski Valet, Inc., Redwood City, Calif. In a preferred construction of this first embodiment, the guide channel is approximately 1-inch deep and 40 inches in overall length. The height of the flange at the rear of the channel is approximately 3 inches, with the flare starting approximately 3 inches inward from the end of the channel. The vertical extension at the front of the channel is approximately 17 inches. The channel is approximately 2 inches wide to accommodate a conventional bicycle wheel. The lock box is approximately 5 inches wide and approximately 8 inches high. The lock bar has a horizontal extension above the vertical of approximately 3½ inches, with the downward legs of the U being approximately 10 inches and 2 inches long. The offset angle of the short downward leg of the U of the lock bar is approximately 30° which simplifies use. The entire rack can be constructed of steel, but preferably the locking mechanism is made of cast aluminum with the lock bar being a hardened steel bar.

Figure 4:
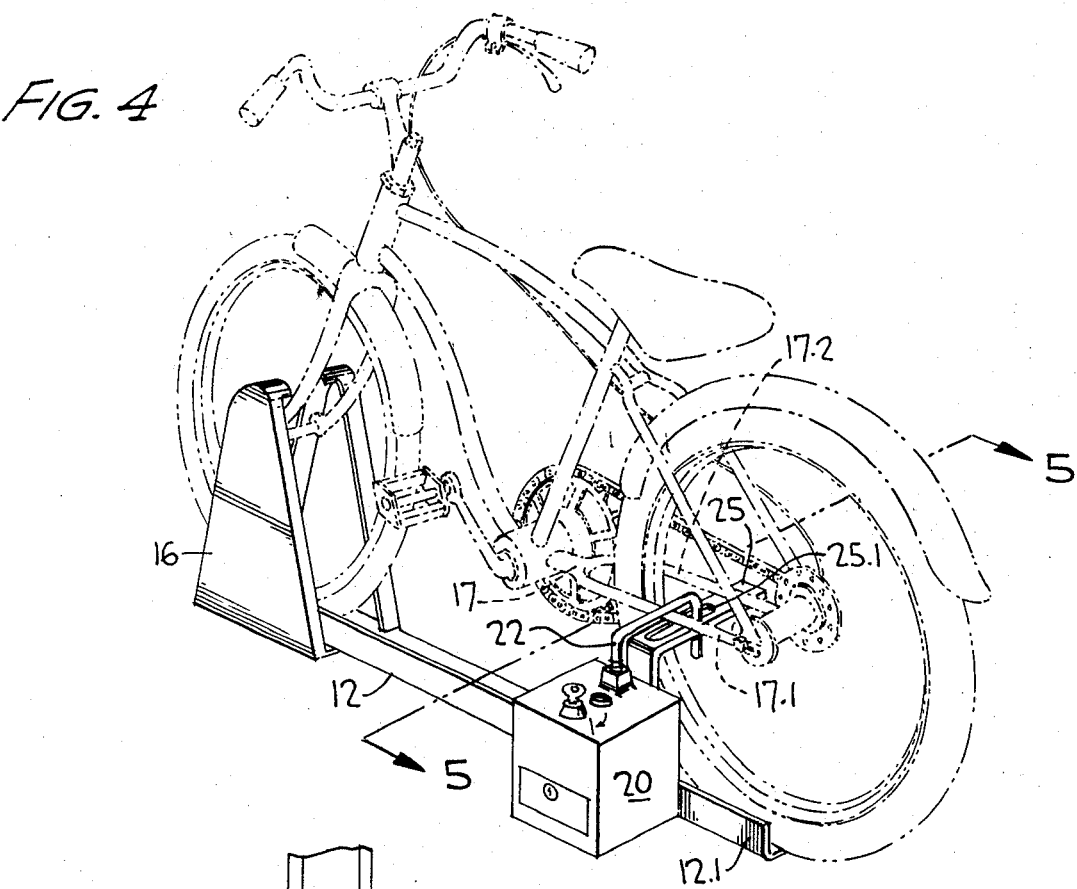
FIG. 4 is a view from the rear and to the side of another embodiment of the lock rack of the present invention having a bicycle positioned in the rack.
Figure 5:
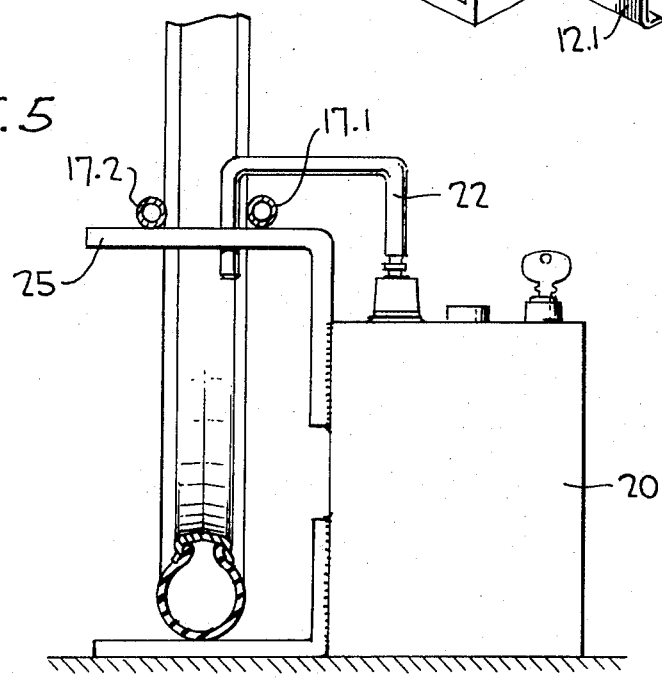
FIG. 5 is a partially sectional view taken along lines 5—5 of FIG. 4.

In the modified embodiment shown in FIG. 4, the guide means 12 has only a single vertical member 12.1 and the lock box 20 is positioned rearward of the sprocket. In addition to lock bar 22, the lock mechanism includes bar member 25 which fits below U-frame member 17 having legs 17.1 and 17.2 for rotatably mounting the rear wheel of the bicycle. This member has a slot 25.1. In operation, lock bar 22 is swung over the inward leg 17.1 of the U-member 17 and locked into position through slot 25.1 of bar 25.

Figure 6:
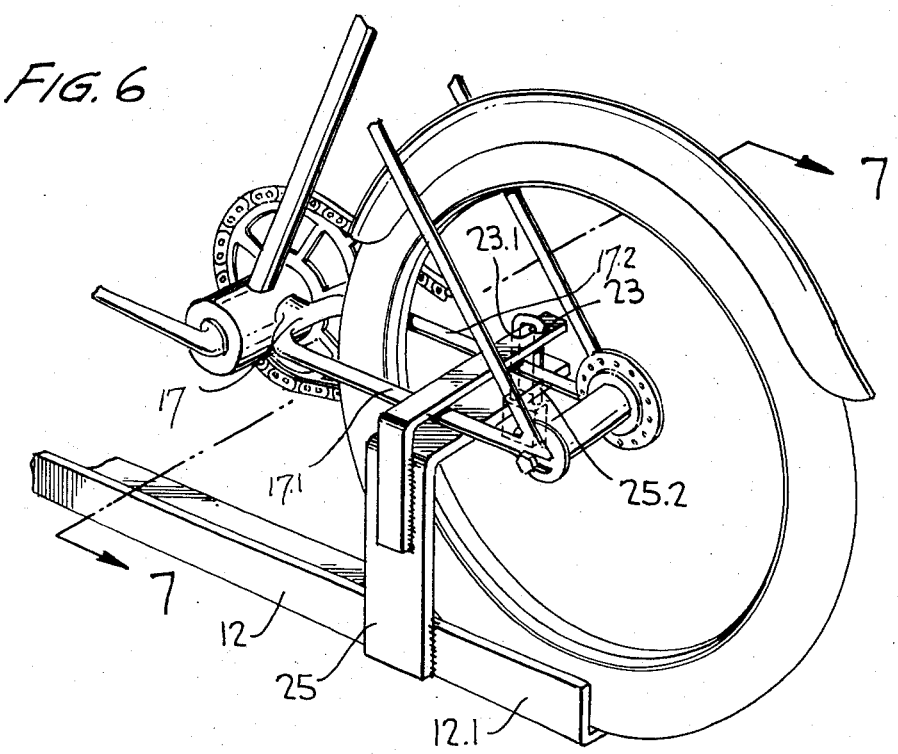
FIG. 6 is a modification of the embodiment shown in FIG. 4.
Figure 7:
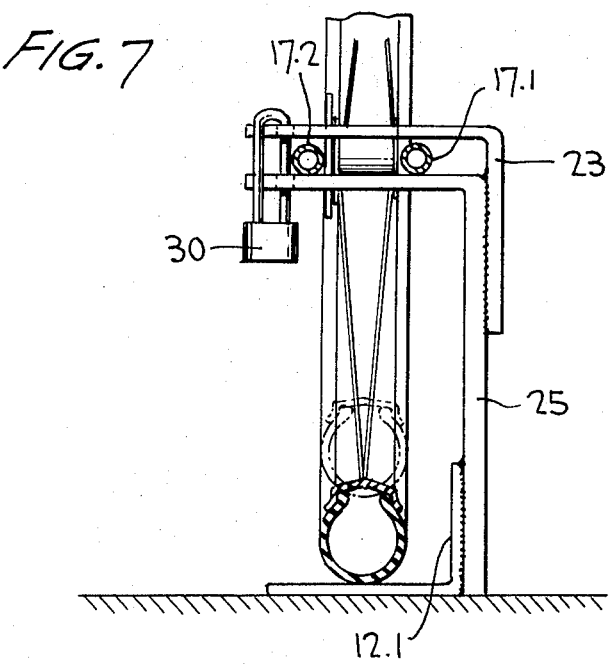
FIG. 7 is a partially sectional view taken along lines 7—7 of FIG. 6.

In the embodiment of FIG. 6, the coin-operated box is not employed. Bar member 25 is secured directly to guide member 12.1 of guide means 12. A second bar member 23 is movably secured or fixedly secured to bar 25. Both legs, i.e., 17.1 and 17.2, of U-frame member 17 are passed through the spaced opening formed by bars 25 and 23. Holes 23.1 and 25.2, or other suitable means, are contained in the outward ends of bars 23 and 25. A padlock 30 is passed through the holes or otherwise secured at the end of the bars to lock the bicycle in place. As is apparent, the bicycle racks of this invention fixedly secure the bicycle in place preventing removal of the bicycle as well as the necessary movement to remove the wheels or wheel gear boxes, etc.

As will be apparent to one skilled in the art, the improved bicycle rack made in accordance with the present invention can have various modifications without departing from the inventive concept herein disclosed. Thus, in the embodiment of FIG. 1, instead of having the rear of the guide channel flared, it can be the same height as the rest of the channel or it can be of rounded shape. Furthermore, while the embodiment shown in FIGS. 4 – 7 utilizes an inward vertical member 12.1 on the guide means, this member can be eliminated and the lock box or securing bar attached directly to the guide means. Furthermore, as noted hereinbefore, it is not essential to have the lock means coin-operated. These and other design modifications will be apparent to one skilled in the art and fall within the scope of the present invention.

It is claimed:

1. A bicycle rack for receiving and locking a bicycle in place and in an upright position comprising guide means constructed and arranged to receive at least the front wheel of a bicycle and having a vertical extension which extends above the hub of the front wheel of a bicycle when a bicycle is received in said rack, said guide means including means for securing said rack to support means, and lock means secured to said guide means at one side thereof substantially at or to the rear of the bicycle sprocket mechanism, said lock means including engaging means for removably receiving and retaining a structural member of a bicycle and means for locking said engaging means to said structural member, said rack being constructed and arranged to prevent removal or substantial movement of a bicycle when locked in place in said rack.

2. The rack of claim 1 wherein said guide means comprises a U-channel having a length sufficient to at least partially receive simultaneously both the front wheel and back wheel of a bicycle.

3. The rack of claim 2 wherein the front end of said U-channel has a vertical extension of sufficient height to extend above the hub of a front wheel of a bicycle when received in said rack.

4. The rack of claim 1 wherein said lock means includes a lock bar and is coin-operated.

5. The rack of claim 1 wherein said lock means is secured to said guide means in order that said engaging means for removable engagement with said bicycle is at the bicycle frame to the rear of the bicycle sprocket mechanism.

6. The rack of claim 5 wherein the lock means includes a first member and a second member, the extreme end of said first member being constructed and arranged to pass through the spokes of the bicycle wheel and under the U-frame member retaining the rear wheel of a bicycle when a bicycle is received in said rack, and a second member constructed and arranged with said first member to permit locking engagement over the top of at least one leg of said U-frame member.

7. The rack of claim 6 wherein the lock means includes a coin-operated lock box secured to said guide means and said second member is a lock bar operated from said coin-operated lock box.

8. The rack of claim 6 wherein the first member is secured to said guide means and said second member is secured to said first member, said members passing under and over the U-frame member of a bicycle, respectively, and said lock means includes a padlock.

9. The rack of claim 8 wherein said guide means includes an L-shaped guide member and said first bar is secured thereto.

10. The rack of claim 7 wherein said guide means includes an L-shaped guide member and said first bar is secured thereto.

* * * * *